United States Patent
Snyder et al.

(10) Patent No.: US 10,041,409 B2
(45) Date of Patent: Aug. 7, 2018

(54) OIL CONTROL MODULE

(71) Applicant: UNITED TECHNOLOGIES CORPORATION, Farmington, CT (US)

(72) Inventors: Ryan K. Snyder, Glastonbury, CT (US); Kari L. Kisselbrack, Portland, CT (US); Jesse Ian Berube, Simsbury, CT (US); Michael C. O'Brien, East Hampton, CT (US); Eric J. Heims, Avon, CT (US); Ryan Timothy Matte, East Hampton, CT (US); Vito Guardi, Stratford, CT (US); Bruce Paradise, Avon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 47 days.

(21) Appl. No.: 14/442,547

(22) PCT Filed: Jan. 30, 2014

(86) PCT No.: PCT/US2014/013757
§ 371 (c)(1),
(2) Date: May 13, 2015

(87) PCT Pub. No.: WO2014/123740
PCT Pub. Date: Aug. 14, 2014

(65) Prior Publication Data
US 2016/0245179 A1   Aug. 25, 2016

Related U.S. Application Data

(63) Continuation of application No. 61/761,554, filed on Feb. 6, 2013.

(51) Int. Cl.
*F01D 25/18* (2006.01)
*F02C 7/06* (2006.01)
*F01D 25/32* (2006.01)

(52) U.S. Cl.
CPC ............... *F02C 7/06* (2013.01); *F01D 25/18* (2013.01); *F01D 25/32* (2013.01);
(Continued)

(58) Field of Classification Search
CPC .... B01D 35/153; B01D 29/21; B01D 35/147; B01D 35/16; F01M 11/03
(Continued)

(56) References Cited

U.S. PATENT DOCUMENTS 4,245,465 A * 1/1981 Milo ............... F16N 27/00
                                                184/6.11
4,428,208 A * 1/1984 Krause ............ F16K 31/18
                                                137/426

(Continued)

OTHER PUBLICATIONS

International Search Report for Application No. PCT/US2014/013757; dated May 23, 2014.
(Continued)

Primary Examiner — Henry Y Liu
(74) Attorney, Agent, or Firm — Cantor Colburn LLP

(57) ABSTRACT

An oil control module for a gas turbine engine is provided comprising a housing on which numerous components of a lubricating system are mounted. The components may include a variable oil reduction valve/shuttle valve, a main oil pressure sensor, a main oil temperature sensor, a main oil filter delta pressure sensor, an oil debris monitor, a lube filter, an active oil damper valve, a cool oil orifice, a knock down orifice and a lube trim orifice. By packing numerous lubricating system components onto or within a housing located adjacent to the gas turbine engine, the oil control
(Continued)

module reduces cost and weight and simplifies the maintenance of the lubricating system.

17 Claims, 3 Drawing Sheets

(52) U.S. Cl.
CPC ...... *F05D 2220/32* (2013.01); *F05D 2260/83* (2013.01); *F05D 2260/98* (2013.01)

(58) Field of Classification Search
USPC .......................................... 184/6.11; 73/756
See application file for complete search history.

(56) References Cited

U.S. PATENT DOCUMENTS

| | | | | |
|---|---|---|---|---|
| 4,589,263 | A * | 5/1986 | DiCarlo | F25B 5/02 62/193 |
| 5,610,341 | A * | 3/1997 | Tortora | F01D 17/02 73/756 |
| 5,968,371 | A | 10/1999 | Verdegan et al. | |
| 6,067,962 | A | 5/2000 | Bartley et al. | |
| 6,267,094 | B1 * | 7/2001 | Kuettner | F01M 1/02 123/196 A |
| 6,425,293 | B1 * | 7/2002 | Woodroffe | G01F 23/0076 73/708 |
| 6,447,573 | B1 * | 9/2002 | Rake | F16N 29/02 95/10 |
| 6,488,845 | B1 * | 12/2002 | Neufeld | B01D 29/21 210/232 |
| 6,510,397 | B1 * | 1/2003 | Choe | F16H 57/0006 702/104 |
| 6,546,814 | B1 * | 4/2003 | Choe | G01H 1/003 73/862.08 |
| 6,694,285 | B1 * | 2/2004 | Choe | G01H 1/003 702/182 |
| 7,137,407 | B2 * | 11/2006 | Sweeney | F01D 17/08 137/552 |
| 7,426,834 | B2 * | 9/2008 | Granitz | F01D 25/18 184/6.11 |
| 7,713,425 | B2 * | 5/2010 | Hanson | B01D 35/143 184/1.5 |
| 7,771,501 | B2 * | 8/2010 | Wang | B01D 45/12 55/337 |
| 7,886,875 | B2 * | 2/2011 | Shevchencko | F01D 21/10 184/6.11 |
| 8,015,810 | B2 * | 9/2011 | Theobald | B60K 6/12 184/6.11 |
| 8,201,662 | B2 | 6/2012 | Delaloye et al. | |
| 8,783,216 | B2 * | 7/2014 | Wilmink | B01D 35/153 123/41.33 |
| 8,925,582 | B2 * | 1/2015 | Lee | F01L 13/00 137/596.17 |
| 2003/0127384 | A1 * | 7/2003 | Kapur | B01D 35/147 210/235 |
| 2006/0096934 | A1 * | 5/2006 | Weinberger | B01D 29/21 210/791 |
| 2006/0254986 | A1 * | 11/2006 | Hanson | B01D 35/143 210/739 |
| 2008/0006229 | A1 * | 1/2008 | Wilmink | B01D 35/153 123/41.33 |
| 2008/0149557 | A1 * | 6/2008 | Reynders | B01D 29/15 210/323.2 |
| 2009/0101558 | A1 * | 4/2009 | Wang | B01D 45/12 210/188 |
| 2010/0025158 | A1 * | 2/2010 | Allam | F01D 17/08 184/6.3 |
| 2011/0056769 | A1 | 3/2011 | Czechowski et al. | |
| 2011/0239660 | A1 * | 10/2011 | Suciu | F01D 15/12 60/784 |
| 2014/0060477 | A1 * | 3/2014 | Watanabe | F01M 1/16 123/196 R |
| 2014/0297045 | A1 * | 10/2014 | Apostolides | F04B 49/00 700/282 |

OTHER PUBLICATIONS

Written Opinion for Application No. PCT/US2014/013757; dated May 23, 2014.

* cited by examiner

OIL CONTROL MODULE

CROSS-REFERENCE TO RELATED APPLICATION

This Application is a US National Stage under 35 USC § 371 of International Patent Application No. PCT/US14/13757 filed on Jan. 30, 2014 based on U.S. Provisional Patent Application Ser. No. 61/761,554 filed on Feb. 6, 2013.

FIELD OF THE DISCLOSURE

The subject matter of the present disclosure relates generally to lubricating control systems for jet aircraft. More particularly, the subject matter of the present disclosure relates to an oil control module for a jet aircraft lubricating system in which various components of the lubricating system are condensed within the module to make it easier to package and maintain the various components of the lubricating system.

BACKGROUND OF THE DISCLOSURE

Gas turbine engines typically comprise a fan delivering air into a compressor section where the air is compressed before being delivered into a combustion section. In the combustion section the air is mixed with fuel and ignited to provide propulsion for the aircraft. Combustion products pass downstream over turbine rotors which are driven to rotate by the combustion products. A lubricating system provides oil to engine bearings, gears and other components within the engine.

The present disclosure is directed to an oil control module for a gas turbine jet aircraft lubricating system in which various components of the lubricating system are condensed within the module, thereby eliminating numerous oil tubes and connections.

SUMMARY OF THE DISCLOSURE

According to an embodiment of the disclosure, an oil control module (OCM) is provided in which various components of the lubricating system are condensed within the module. By co-locating (packing) numerous lubricating system components within an OCM housing located adjacent to the gas turbine engine, the OCM of the present disclosure reduces cost and weight and simplifies the maintenance of the lubricating system. The OCM also permits improved hardware packaging in a highly limited engine design space.

The OCM may comprise a housing having an exterior and defining an interior; one or more oil processing components hard mounted to the housing, a lube filter located within the housing and one or more plug-like devices defining orifices located within the housing and configured to passively regulate the flow of oil in circuits located within the oil control module.

The oil processing components may include a variable oil reduction valve/shuttle valve, a main oil pressure sensor, a main oil temperature sensor; a main oil filter delta pressure sensor; and an oil debris monitor. The oil processing components may be hard mounted to the exterior of the housing.

The one or more plug-like devices may include a cool oil orifice, a knock down orifice, and a lube trim orifice. Preferably the plug-like devices are configured and positioned within the housing so they can easily be changed out.

The oil control module may further comprise a lube filter located within the housing.

The oil control module may also comprise a plurality of oil tubes running into and out of the housing for accommodating fluid flow. The oil tubes may include a plurality of lube in lines and a plurality of lube out lines.

The oil control module may further comprise an active oil damper valve located in fluid communication with one of the lube out lines. The active oil damper valve may be hard mounted to the outside of the housing. The oil control module may further comprise a vent line running from the variable oil reduction valve/shuttle valve and tied into the active oil damper valve.

In another aspect of the disclosure an oil control module is provided comprising a housing containing multiple lubricating components and one or more internally manifolded systems that permit the functional interconnection between two or more of the components. The lubricating components may include a variable oil reduction valve/shuttle valve, a main oil pressure sensor, a main oil temperature sensor, a main oil filter delta pressure sensor, an oil debris monitor, a lube filter, an active oil damper valve, a cool oil orifice, a knock down orifice and a lube trim orifice.

In still another aspect of the disclosure a method of installing lubricating system components for a gas turbine engine, the method comprising the steps of:

providing an oil control module comprising a housing, one or more oil processing components hard mounted to an exterior of the housing, and one or more plug-like devices defining oil flow control orifices located within the housing; and mounting the oil control module to the gas turbine engine, preferably aft of the compressor section and forward the turbine section.

Although the different examples described herein may have the specific components shown in the illustrations, embodiments of this disclosure are not limited to those particular combinations of components. It is possible to use some of the components or features from one of the examples in combination with features or components from another one of the examples.

BRIEF DESCRIPTION OF THE DRAWINGS

So that the manner in which the concepts of the present disclosure recited herein may be understood in detail, a more detailed description is provided with reference to the embodiments illustrated in the accompanying drawings. It is to be noted, however, that the accompanying drawings illustrate only certain embodiments and are therefore not to be considered limiting of the scope of the disclosure, for the concepts of the present disclosure may admit to other equally effective embodiments. Moreover, the drawings are not necessarily to scale, emphasis generally being placed upon illustrating the principles of certain embodiments.

Thus, for further understanding of these concepts and embodiments, reference may be made to the following detailed description, read in connection with the drawings in which.

DETAILED DESCRIPTION

The present disclosure relates to a lubricating system for jet aircraft in which pressurized oil flows to various areas of the engine. In particular, the disclosure relates to an oil control module for a jet aircraft lubricating system in which various components of the lubricating system are condensed within an oil control module that is easy to package and easy to maintain. Components that would normally be distributed in various locations throughout the lubricating system and separately plumbed, such as valves and sensors, are consolidated into a single oil control module.

The oil control module eliminates numerous tube routings and connections that would normally be required to connect the various lubricating system components by consolidating them into a single oil control module. These advantages are especially important in newer geared engines having more complex lubricating systems but less space for packaging lubricating components. The oil control module is not limited to geared engines however, since the oil control module can be part of a lubricating system that lubricates bearings and/or other components.

Figure 1:
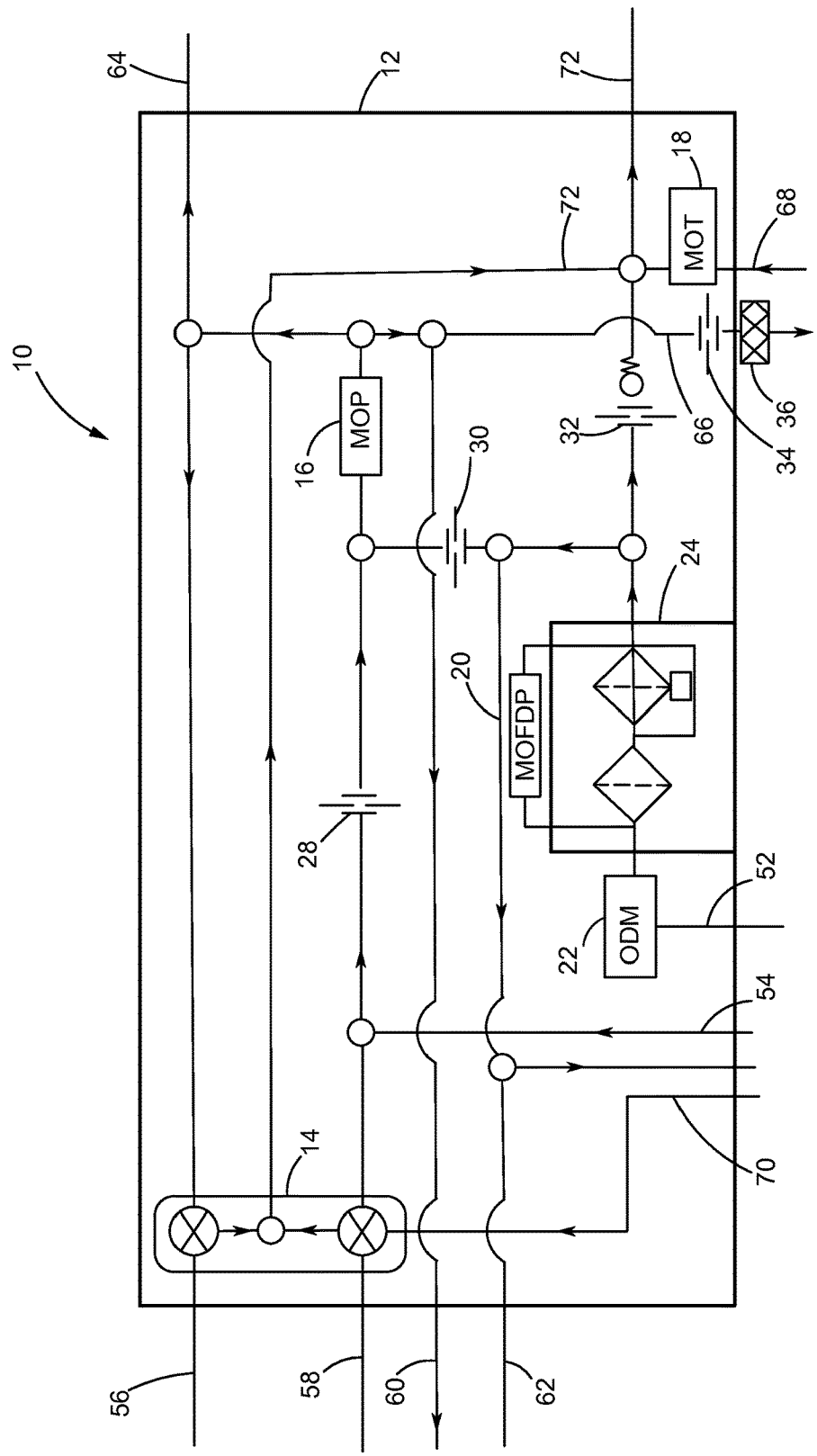
FIG. 1 is a schematic diagram of a first embodiment of an oil control module according to the present disclosure.

Turning to the figures, FIG. 1 is a schematic diagram of a first embodiment of an oil control module 10 according to the present disclosure. The oil control module 10 (OCM) comprises a housing 12 to which may be mounted, either externally or internally, numerous lubricating system components such as a variable oil reduction valve/shuttle valve (VORV) 14, a main oil pressure sensor 16 (MOP), a main oil temperature sensor 18 (MOT), a main oil filter delta pressure sensor 20 (MOFDP), and an oil debris monitor 22 (ODM) and a main oil filter 24 (a.k.a. lube filter). The OCM 10 may further comprise plug-like devices for controlling oil flow, including a cool oil orifice 28, a knock down orifice 30 and a lube trim orifice 32. A fourth orifice 34 may be located upstream of a last chance screen 36 which is external to the housing 12. In addition, the housing 12 may contain electronic control and power signals that interface with the lubricating system components. The various components may be plumbed in a manner that keeps them close together.

Oil tubes and electrical conduit run into and out of the OCM 10. For example, and by way of illustration only, oil may flow into the OCM 10 through a first lube in line 52 and a second lube in line 54. Oil may exit the OCM 10 through a first lube out line 56 to lubricate the engine gears (not shown) and through a second lube out line 58 to lubricate a journal bearing compartment (not shown). Oil may also exit the OCM 10 through a third lube out line 60, a fourth lube out line 62, a fifth lube out line 64 and a sixth lube out line 66 to lubricate other engine components. Oil may also enter the OCM 10 through an auxiliary in line 70 and a scavenger line 68 and exit the OCM 10 through a scavenger out line 72.

Some of the oil processing components may be hard mounted to the housing 12, typically onto the exterior of the housing 12, making access and maintenance easier, while the oil circuits may be located within (inside) the housing 12. "Hard mounted" means the component is mounted in fixed or semi-fixed relationship to the housing 12. Hard mounting may be accomplished in any suitable manner, including without limitation by bolting, brazing or welding. For example, the VORV 14 may be hard mounted onto the exterior of the housing 12, making it easily separable from the housing 12. Similarly, the MOP 16 may be hard mounted to the housing exterior and piloted into the housing 12 to sense oil pressure within a cavity within the housing 12. The MOT 18 may be hard mounted to the exterior to the housing 12 and may sense the temperature of an oil line within the housing 12. The MODFP 20 may be a bolt-on unit, and so too may be the ODM 22.

The internal, removable plug-like devices referred to herein as orifices can be sized to passively regulate oil flow through the circuits (bearing compartment supply lines) located within the OCM 10 according to engine needs. The orifices can be changed out as needed. The cool oil orifice 28 preferably is internal, that is, located within the housing 12. Similarly, the knock down orifice 30 and the lube trim orifice 32 are internal to the housing 12. Finally, the lube filter 24 may be located within the housing 12, which is configured so that the lube filter 24 can easily be changed out.

Figure 2:
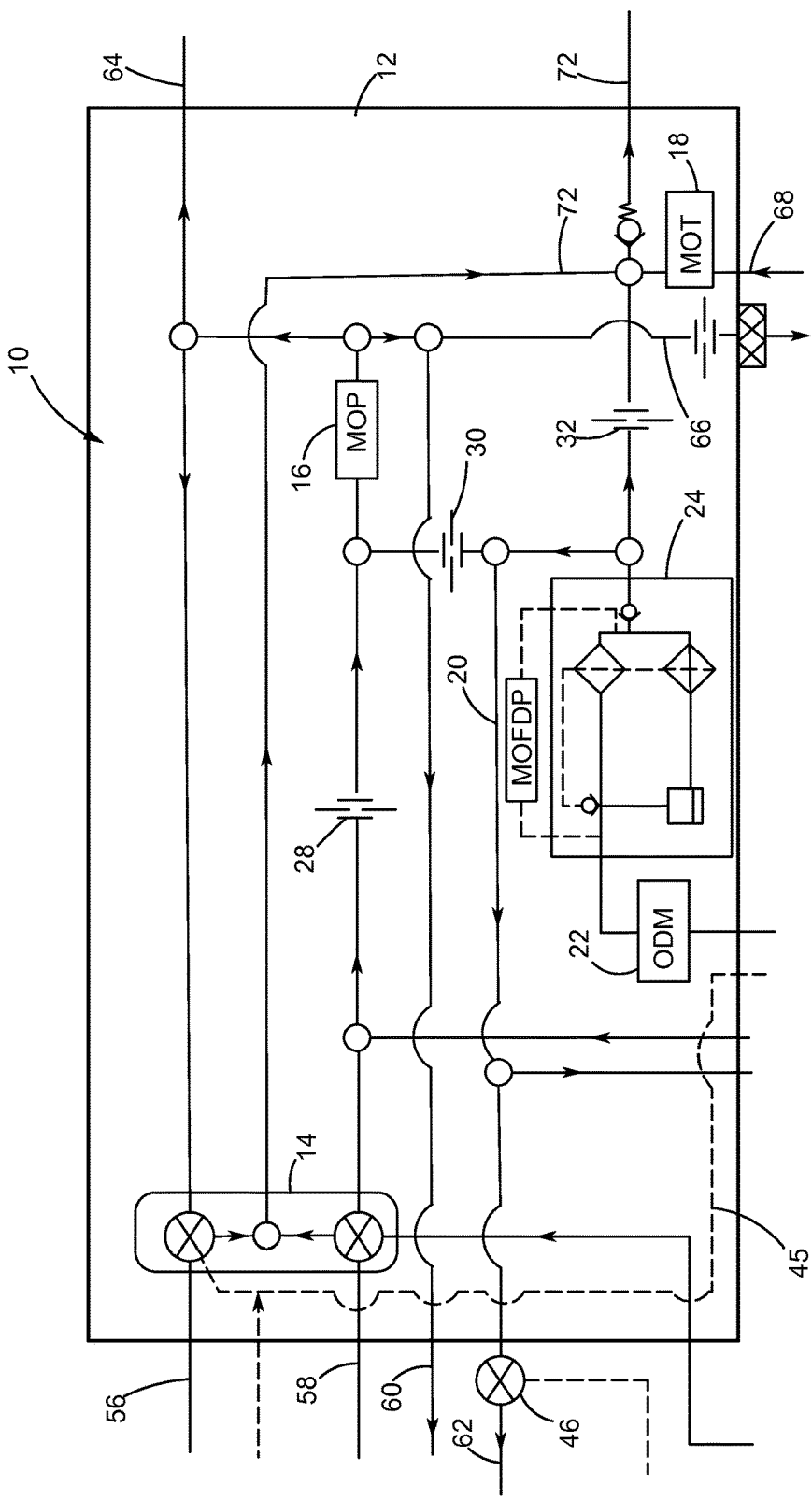
FIG. 2 is a schematic diagram of a second embodiment of an oil control module according to the present disclosure.

FIG. 2 is a schematic diagram of a second embodiment of an oil control module 40 according to the present disclosure, the configuration and operation of which is similar to the first embodiment depicted. Like the first embodiment, the OCM 40 comprises a housing 12 containing numerous lubricating system components such as a variable oil reduction valve/shuttle valve (VORV) 14, a main oil pressure sensor 16 (MOP), a main oil temperature sensor 18 (MOT), a main oil filter delta pressure sensor 20 (MOFDP), an oil debris monitor 22 (ODM), a main oil filter 24, an active oil damper valve 46 (AODP), a cool oil orifice 28, a knock down orifice 30 and a lube trim orifice 32.

An active oil damper valve (AODV) 46 may be provided in one of the lube out lines and hard mounted to the outside of the OCM housing 12. The second embodiment also includes a vent line 45 running from the VORV 14 outside of the housing 12. The pressure driven vent line 45 is dedicated to and may be tied into the AODV 46.

In another aspect of the disclosure an oil control module 10, 40 is provided comprising a housing 12 on which may be mounted multiple lubricating components and one or more internally manifolded systems that permit the functional interconnection between two or more of the lubricating components. The lubricating components may include a variable oil reduction valve/shuttle valve 14, a main oil pressure sensor 16, a main oil temperature sensor 18, a main oil filter delta pressure sensor 20, an oil debris monitor 22, a lube filter 24, an active oil damper valve 46, a cool oil orifice 28, a knock down orifice 30 and a lube trim orifice 32. Further functional integration of the lubricating components can achieve a further reduction in electrical conduits to and from the OCM.

Figure 3:
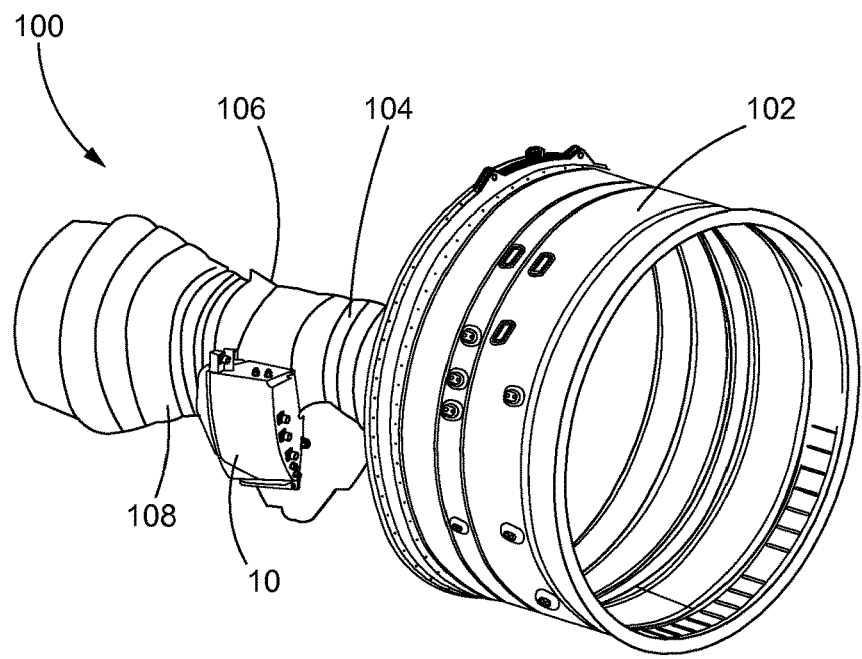
FIG. 3 is a side perspective view of a jet engine equipped with an oil control module.

FIG. 3 is a side perspective view of a gas turbine engine 100. The gas turbine engine 100 generally comprises a fan section 102, a compressor section 104, a combustor section 106 and a turbine section 108. Alternative engines might include an augmenter section (not shown) among other systems or features. The fan section 102 drives air along a bypass flow path while the compressor section 104 drives air along a core flow path for compression and communication into the combustor section 106, then expansion through the turbine section 108. Although depicted as a turbofan gas turbine engine in the disclosed non-limiting embodiment, it should be understood that the concepts described herein are not limited to use with turbofans as the teachings may be applied to other types of turbine engines including three-spool architectures. An oil control module 10 according to the disclosure may be mounted in a location close to and exterior of the gas turbine engine 100. For example, the housing 12 may be mounted to the engine 100 aft of the compressor section 104 and forward the turbine section 108.

Figure 4:
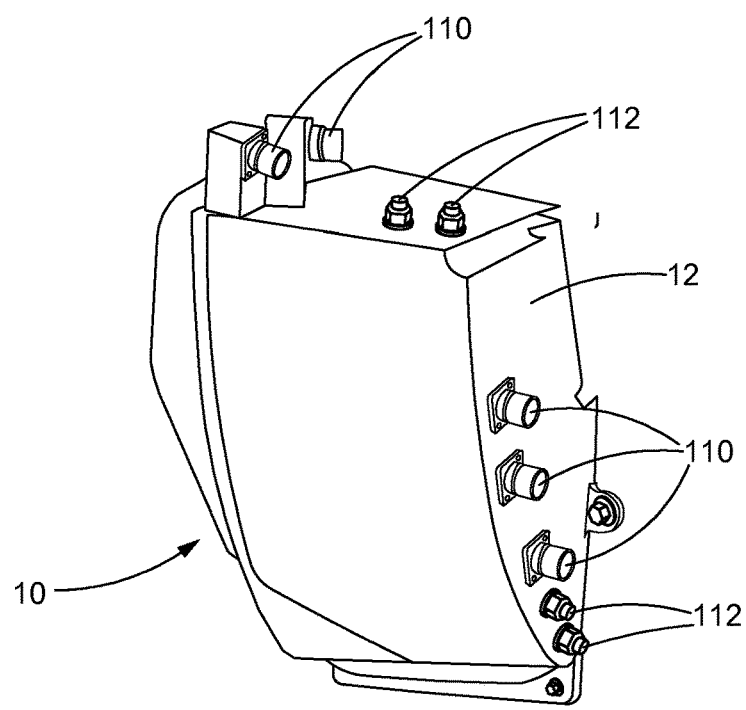
FIG. 4 is an enlarged side perspective view of the oil control module of FIG. 3.

FIG. 4 is an enlarged side perspective view of the oil control module 10 of FIG. 3 shown without certain external lubricating components for clarity. As explained above, numerous components (not shown) may bolt onto the housing 12, typically onto the exterior of the housing 12 thereby making access and maintenance easier, while the oil circuits may be located within (inside) the housing 12. Electrical interfaces 110 and plumbing interfaces 112 may extend from the housing 12.

In another aspect of the disclosure a method of installing lubricating system components for a gas turbine engine 100 is provided, the method comprising the steps of:

providing an oil control module 10, 40 comprising a housing 12, one or more oil processing components hard mounted to an exterior of the housing 12, and one or more plug-like devices defining orifices located within the housing 12; and mounting the oil control module 10 to the engine 100, preferably aft of the compressor section 104 and forward the turbine section 108.

While the present disclosure has been shown and described in terms of one or more exemplary embodiments, it will be understood by one skilled in the art that various changes in detail may be effected therein without departing from the spirit and scope of the disclosure as defined by claims that may be supported by the written description and drawings. Further, where these exemplary embodiments (and other related derivations) are described with reference to a certain number of elements it will be understood that other exemplary embodiments may be practiced utilizing either less than or more than the certain number of elements.

What is claimed is:

1. An oil control module comprising:
   a housing;
      one or more oil processing components hard mounted to the housing, the housing having an exterior and defining an interior;
      a lube filter located within the housing interior; and
      one or more removable plug-like devices defining orifices located within the housing interior and configured to passively regulate a flow of oil in circuits located within the oil control module.

2. The oil control module of claim 1 wherein the one or more oil processing components includes:
   a variable oil reduction valve/shuttle valve;
   a main oil pressure sensor;
   a main oil temperature sensor;
   a main oil filter delta pressure sensor; and
   an oil debris monitor.

3. The oil control module of claim 2 wherein the one or more oil processing components are hard mounted to the exterior of the housing.

4. The oil control module of claim 3 wherein the one or more plug-like devices includes:
   a cool oil orifice;
   a knock down orifice; and
   a lube trim orifice.

5. The oil control module of claim 4 wherein the one or more plug-like devices are configured such that they can be changed out.

6. The oil control module of claim 5 further comprising:
   a lube filter removably located within the housing interior, the housing configured such that the lube filter can be removed out.

7. The oil control module of claim 6 further comprising:
   a plurality of oil tubes running into and out of the housing for accommodating fluid flow.

8. The oil control module of claim 7 wherein the plurality of oil tubes includes:
   a plurality of lube in lines; and
   a plurality of lube out lines.

9. The oil control module of claim 8 further comprising:
   an active oil damper valve located in fluid communication with one of the lube out lines.

10. The oil control module of claim 9 wherein:
    the active oil damper valve is hard mounted to the outside of the housing.

11. The oil control module of claim 10 further comprising:
    a vent line running from the variable oil reduction valve/shuttle valve and tied into the active oil damper valve.

12. An oil control module comprising:
    a housing on which are mounted multiple lubricating components, the housing defining an interior;
    a lube filter located within the housing interior; and
    one or more internally manifolded systems that permit a functional interconnection between two or more of the lubricating components, the multiple lubricating components including one or more removable plug-like devices defining orifices located within the interior of the housing and configured to passively regulate a flow of oil in circuits located within the oil control module.

13. The oil control module of claim 12 wherein the multiple lubricating components comprise:
    a variable oil reduction valve/shuttle valve;
    a main oil pressure sensor;
    a main oil temperature sensor;
    a main oil filter delta pressure sensor; and
    an oil debris monitor.

14. The oil control module of the claim 13 wherein the multiple lubricating components further comprise:
    an active oil damper valve; and
    wherein the orifices of the one or more removable plug-like devices are one of: a cool oil orifice; a knock down orifice; and a lube trim orifice.

15. The oil control module of the claim 13 further comprising: electrical interfaces and plumbing interfaces extending from the housing.

16. The oil control module of claim 15 wherein:
    the housing is configured to mount to a gas turbine engine in a location close to and exterior of the gas turbine engine.

17. The oil control module of claim 16 wherein:
    the gas turbine engine comprises a fan section, a compressor section, a combustor section and a turbine section; and
    the housing is configured to mount aft of the compressor section and forward the turbine section.

* * * * *